US006657536B1

(12) United States Patent
Avenel

(10) Patent No.: US 6,657,536 B1
(45) Date of Patent: Dec. 2, 2003

(54) PROCESS FOR THE BIDIRECTIONAL TRANSMISSION OF DATA AND SYSTEM FOR THE IMPLEMENTATION THEREOF

(75) Inventor: Jean-Jacques Avenel, Chennevieres (FR)

(73) Assignee: Valeo Securite Habitacle, Creteil (FR)

( * ) Notice: Subject to any disclaimer, the term of this patent is extended or adjusted under 35 U.S.C. 154(b) by 419 days.

(21) Appl. No.: 09/584,101

(22) Filed: May 31, 2000

(30) Foreign Application Priority Data

Jun. 1, 1999 (FR) .......................................... 99 06863

(51) Int. Cl.$^7$ .............................. H04B 1/38; H04B 1/00

(52) U.S. Cl. .................... 340/5.61; 340/5.62; 340/5.63; 340/5.72

(58) Field of Search ................................ 340/5.2, 5.61, 340/5.62, 5.63, 5.64, 5.7, 5.72, 10.1, 825.69, 825.72

(56) References Cited

U.S. PATENT DOCUMENTS

| | | | | | |
|---|---|---|---|---|---|
| 4,042,906 | A | * | 8/1977 | Ezell | 340/870.13 |
| 4,384,288 | A | * | 5/1983 | Walton | 235/380 |
| 4,495,496 | A | * | 1/1985 | Miller, III | 340/10.1 |
| 4,788,542 | A | * | 11/1988 | Tanabe | 307/10.2 |
| 4,794,268 | A | * | 12/1988 | Nakano et al. | 307/10.2 |
| 4,980,680 | A | * | 12/1990 | Knoll et al. | 307/10.3 |
| 5,142,281 | A | * | 8/1992 | Park | 340/989 |
| 5,157,389 | A | * | 10/1992 | Kurozu et al. | 307/10.2 |
| 5,355,513 | A | * | 10/1994 | Clarke et al. | 340/870.02 |
| 5,723,911 | A | | 3/1998 | Glehr | |
| 5,995,017 | A | * | 11/1999 | Marsh et al. | 340/10.2 |
| 6,046,680 | A | * | 4/2000 | Soenen et al. | 340/5.23 |
| 6,411,199 | B1 | * | 6/2002 | Geiszler et al. | 340/10.1 |

FOREIGN PATENT DOCUMENTS

| | | | |
|---|---|---|---|
| EP | 0 556 910 | A | 8/1993 |
| EP | 0 685 825 | A | 12/1995 |

OTHER PUBLICATIONS

National Semiconductor,"LM1872 Radio Control Receiver/ Decoder", Feb. 1989.*

* cited by examiner

*Primary Examiner*—Brian Zimmerman
*Assistant Examiner*—Clara Yang
(74) *Attorney, Agent, or Firm*—Liniak, Berenato & White

(57) ABSTRACT

A process for the bidirectional transmission of data, in a hands-free vehicle access system, comprising the step of setting up a remote exchange of data between a recognition device installed in the vehicle and an identifier intended to be carried by a user, access being authorized only when the recognition device has authenticated the identifier, and the steps of setting up an exchange of data at the same radio frequency (RF) exchange between the recognition device and the identifier, and in delaying, in the course of this exchange, the transmission of a response signal by the identifier to the recognition device by a predetermined duration with respect to the reception by the identifier of an interrogation signal transmitted by the recognition device, so that neither the recognition device nor the identifier operate simultaneously in transmission and in reception at the RF exchange.

14 Claims, 2 Drawing Sheets

PROCESS FOR THE BIDIRECTIONAL TRANSMISSION OF DATA AND SYSTEM FOR THE IMPLEMENTATION THEREOF

BACKGROUND OF THE INVENTION

1. Field of the Invention

The present invention relates to a process for the bidirectional transmission of data and to a system for the implementation thereof.

2. Description of Related Art

In an access system, for example of the so-called "hands-free" type, allowing access to an enclosed space, in particular to a motor vehicle, such a process is used to set up a remote exchange of data between a recognition device installed in the enclosed space and an identifier intended to be carried by a user, access being authorized only when the recognition device has authenticated the identifier. However, such an access system runs the risk of being tampered with by a transmission/reception assembly interposed into the wireless communication between the recognition device and the identifier, this transmission/reception assembly serving, in fact, solely as a repeater.

For example, two criminals acting in concert could obtain access to the enclosed space in the following manner. A first criminal, equipped with a transmission/reception system installed for example in a bag, approaches the closed vehicle from which an authorized user has just alighted, whilst a second criminal, equipped with a transmission/reception system similar to that of the first criminal, follows the authorized user carrying the identifier. When the authorized user is sufficiently far away, the first criminal triggers an identification operation, for example by pressing on a control button situated on the door. Signals transmitted by the recognition device are relayed by the transmission/reception system of the first criminal to the system of the second criminal, which repeats the signals of the recognition device to the identifier. The latter will then respond with the authorized code, which is forwarded by the repeater system to the recognition device which orders the unlocking of the locks and grants access to the criminal.

To solve this problem, the principle of the invention consists in analyzing the delay time between the signal transmitted by the recognition device and the signal returned by the identifier. The finer the measurement of this time, the greater will be the possibility of detecting small spurious delays. Furthermore, the greater the frequency used for the outward/return communication, the better will be the fineness of the measurement since the delay constants due to the various filters and processing circuits will be smaller. Given that one wishes to bar access to the vehicle, when bidirectional transmission is performed at a distance of greater than around 5 to 10 meters, it would be necessary to be able to measure a communication time variation of the order of from 200 to 300 ns, this delay time corresponding to the duration of transmission of the signal as a function of the distance separating the recognition device from the identifier.

In a known system, the interrogation signal is transmitted by the recognition device at low frequency, for example at 125 kHz, and the identifier returns a response signal at radio frequency, for example at 433.92 MHz. In such a system, the recognition device receives the response signal with a delay time which is the sum of the time related to the passband of the electronic circuits and of the time related to the distance separating the recognition device and the identifier. The time related to the distance is of the order of 6.6 ns/m, whilst the time related to the passband may be of the order of 120 μs with inherent flutter of 8 μs. It is therefore understood that in order to calculate a delay of the order of 300 ns, this delay is swamped by the resolution of the system which is greater than 8 μs. In fact, to detect a delay of 300 ns, the time related to the passband would have to be not greater than 1 μs with inherent flutter of at most 100 to 200 ns.

SUMMARY OF THE INVENTION

The aim of the invention is to propose a process for the bidirectional transmission of data, in which it is possible to detect a small delay time, as a function of the distance separating the identifier from the recognition device.

For this purpose, the subject of the invention is a process for the bidirectional transmission of data, in an access system, for example of the so-called "hands-free" type, allowing access to an enclosed space, in particular to a motor vehicle, the process consisting in setting up a remote exchange of data between a recognition device installed in the enclosed space and an identifier intended to be carried by a user, access being authorized only when the recognition device has authenticated the identifier, which process consists in setting up an exchange of data at the same radio frequency, so-called exchange RF, for example at 315, 434 or 868 MHz, between the recognition device and the identifier, and in delaying, in the course of this exchange, the transmission of a response signal by the identifier to the recognition device by a predetermined duration, for example 0.8 μs, with respect to the reception by the identifier of an interrogation signal transmitted by the recognition device, so that neither the recognition device nor the identifier operate simultaneously in transmission and in reception at said exchange RF. In such a monofrequency communication system, by delaying the retransmission of the signal by the identifier, the transmitter/receiver assembly of the identifier is prevented from operating as an oscillator.

Indeed, if such a delay were not provided, the signal transmitted by the recognition device would be picked up by the identifier, amplified, then retransmitted directly to the recognition device, this retransmitted signal being picked up again by the receiving antenna of the identifier, through electromagnetic radiation, generating an oscillation generally at the central frequency of the bandpass filter at the head of the amplification circuit of the identifier. This problem of the oscillation of the identifier originates from the fact that the latter operates as a receiver, and not simply as a reflector of the wave transmitted by the vehicle.

Advantageously, the process consists in transmitting, at the level of the recognition device, a pulsed oscillating signal, the carrier frequency of each pulse of which corresponds to said exchange RF, the duration of each pulse being very short, for example of the order of 0.5 μs, with respect to the recurrence period, for example of the order of 50 μs, of the pulses, in receiving, at the level of the identifier, said pulsed oscillating signal and in delaying its retransmission to the recognition device by said predetermined duration, which is greater than the duration of a pulse and markedly less than said recurrence period, in retransmitting said delayed pulsed oscillating signal to the recognition device, and in receiving, at the level of the recognition device, said delayed pulsed oscillating signal retransmitted by the identifier.

In this case, the process can comprise, at the level of the identifier, the following steps which consist: in amplifying the received signal, in delaying said amplified received signal by said predetermined duration, in detecting the end of each pulse of the amplified received signal, in deactivating the amplification of the receiver and in activating the amplification of the transmitter of the identifier after the detection of the end of each pulse, in amplifying the delayed signal so as to retransmit it to the recognition device, in deactivating the amplification of the transmitter and in activating the amplification of the receiver of the identifier, at the conclusion of a given timeout, for example of the order of 5 μs, counting from the detection of the end of each pulse.

Preferably, the process consists, at the level of the recognition device, in order to transmit said pulsed oscillating signal at the exchange RF: in generating an oscillating signal at a reference radio frequency Fo substantially different from the exchange RF, in generating a continuous pulsed signal, the so-called first control signal, having the same recurrence period and the same duration of the pulses as the aforesaid pulsed oscillating signal, in feeding a frequency divider by N with said first control signal, in inputting into said divider said oscillating signal so as to output a pulsed oscillating signal having a frequency Fo/N, in mixing said pulsed oscillating signal at Fo/N with said oscillating signal at Fo, in filtering the outgoing mixed signal so as to center it on the frequency Fo+Fo/N, said central frequency corresponding to the exchange RF, and in transmitting said filtered mixed signal to the identifier.

In the recognition device, the reference frequency of the oscillating signal is not the exchange RF, since otherwise, the presence of a permanent oscillator in proximity to the reception circuit of the recognition device would have the effect of saturating the reception circuit which is intended to receive a response signal at this same frequency. The saturation of the reception circuit at the reference oscillation frequency may arise through radiation and electrical conduction across the earths of the device, even if the oscillator is shielded against electromagnetic disturbances. Given that the remote exchange of data is carried out at the same exchange RF, it is necessary for this signal to be transmitted with high accuracy, for example with a maximum variation of +/−150 kHz. To obtain such accuracy, so-called surface wave resonators may be used, whose startup time is very long, for example around 10 μs. Thus, it is not possible to use a fast chopper coupled with an oscillator whose frequency would be the exchange RF, since the oscillator would have to be restarted with each pulse, this being incompatible with the generation of a pulse of a duration of the Order of 500 ns. Furthermore, the reception circuit would be saturated at the oscillation frequency of the oscillator, for a duration of around 2 μs, and this would prevent the reception circuit of the recognition device from receiving the signal returned by the identifier, with an overall delay of around 1 μs.

Advantageously, the process consists in switching the recognition device over to its transmission circuit or its reception circuit, in response to the first control signal, the recognition device switching over to the transmission circuit during each pulse of the first control signal and over to the reception circuit between the pulses of said first control signal.

According to another characteristic of the invention, the process consists, at the level of the recognition device, in receiving the delayed pulsed oscillating signal retransmitted by the identifier, in mixing it with said oscillating signal at Fo, in filtering the outgoing signal thus mixed so as to center it on the frequency Fo/N, in detecting the envelope of the signal thus filtered, in measuring the time interval between the rising edge of each pulse of the first control signal and the rising edge of each pulse of the detected envelope signal, in comparing this time measurement with an initially stored delay value, for example of the order of 1 μs, which is learnt by the system, so as to prevent the exchange of identification data if the statistical deviation over several pulses between the time measured and the time stored, is greater than a predetermined threshold value, for example 200 ns, so as to make transmission secure beyond a predetermined distance, for example 5 to 10 meters, in particular so as to avoid tampering through the interposition of an unauthorized repeater between the recognition device and the identifier.

In this case, the process can consist, at the level of the recognition device, for the reception of the signal retransmitted by the identifier, in generating a continuous pulsed observation signal, the duration of whose pulses, for example 400 ns, corresponds to a listening window, with the same recurrence period as the first control signal, said window being centered on the initially stored delay value, and in detecting any rising edge of a pulse of the detected envelope signal in the course of each listening window. It is thus understood that the predetermined threshold value corresponds to half a listening window, for example around 200 μs.

According to yet another characteristic, the process consists, at the level of the recognition device, for the reception of the signal retransmitted by the identifier, in generating a second continuous pulsed control signal, each pulse of which starts at the end of each pulse of the first control signal and terminates after a duration less than the recurrence period of the first control signal, said second control signal serving to feed the reception mixer of the recognition device.

The process can consist, at the level of the identifier, in disabling the retransmission of certain pulses according to a predetermined sequence which is previously forwarded by the recognition device, and, at the level of the recognition device, in measuring the time interval for the pulses received during the listening windows corresponding to the non-disabled pulses, and in counting up the number of pulses possibly received during the listening windows corresponding to the disabled pulses, so as to detect any presence of an unauthorized repeater in proximity to the recognition device, at a distance below the authorized maximum limit. In this case, the process can consist, at the level of the identifier, in chopping the delayed signal before its retransmission, according to the binary value of the bits of a coded identification signal previously forwarded by the recognition device.

The invention is also aimed at a system for the bidirectional transmission of data for implementing the process as defined above, which system comprises a recognition device installed in the enclosed space, comprising a radio frequency transmission circuit, a radio frequency reception circuit which are both linked to the same first antenna, by way of a two-way switch, an identifier intended to be carried by a user, comprising a radio frequency transmitter and a radio frequency receiver, which are both linked to the same second antenna, by way of a second two-way switch, and a delayer means interposed between the output of the receiver and the input of the transmitter of the identifier, so as to delay the retransmission of the signal by the identifier at the same exchange RF as the transmission of the signal by the recognition device, by a predetermined duration so as to avoid any overlap between the signals received and transmitted by the identifier or the recognition device.

According to one particular embodiment, the receiver of the identifier comprises a reception amplifier linked, at its input, to a first so-called receiving terminal of the second switch and, at its output, on the one hand, to the aforesaid delayer means, and on the other hand, to a level detector, whereas the transmitter of the identifier comprises a transmission amplifier, linked, at its input, to the output of the delayer means and, at its output, to a second so-called transmitting terminal of the second switch, the third common terminal of the second switch being linked to a bandpass filter centered on the exchange RF which is linked, in its turn, in series to said second antenna, the identifier comprising a central control unit which is able to receive the output signal from the level detector so as to control the feeding or the deactivation of the amplifiers and the switching over of the second switch.

Provision may be made for a chopper to be interposed between the transmission amplifier and the transmission terminal of the identifier, said chopper being controlled by the central control unit so as to disable the retransmission of certain pulses according to a predetermined sequence.

In one particular embodiment, the transmission circuit of the recognition device comprises an oscillator with reference frequency Fo which is intended to deliver an oscillating output signal at said reference frequency, said output signal being supplied in parallel to a frequency divider by N and to a mixer, said divider being intended to be fed with a first continuous pulsed control signal delivered by a central management unit, the output terminal of the divider being linked to another input of the mixer, the mixer being linked at its output to a transmission amplifier with power gain, whose output is linked to a first so-called transmission terminal of the first switch of the recognition device. In this case, the reception circuit of the recognition device can comprise a low-gain preamplifier, linked at its input to a second so-called reception terminal of the first switch, the output of the preamplifier being linked to a second mixer which receives, on its second input, the oscillating signal at Fo delivered in parallel by the oscillator of the transmission circuit, said second mixer being linked in series to a bandpass filter centered on the frequency Fo/N, then to a gain amplifier, and to an envelope detector which is connected to said central management unit.

According to another characteristic, the first switch comprises a third common terminal linked in series to a bandpass filter centered on the exchange RF and to said first antenna, the first switch being controlled by said first control signal.

According to yet another characteristic, the central management unit is able to generate a second continuous pulsed control signal whose pulses are alternated with those of the first control signal, so as to control the feeding of the preamplifier, of the amplifier and of the mixer of the reception circuit of the recognition device.

In one particular embodiment, the delayer means comprises a delay line, consisting for example of surface wave components. Surface wave components use the acoustic propagation of electromagnetic waves over a quartz bar, the speed of propagation being of the order of 300 m/s. To delay the retransmission of the signal, the signal received could also be stored and then retrieved. For this purpose, the signal can be stored with the aid of a calibrated RC circuit, then reshaped and regenerated with the aid of an arrangement similar to the transmission circuit of the recognition device, so as to preclude the saturation of the receiver of the identifier.

BRIEF DESCRIPTION OF THE DRAWINGS

For a better understanding of the subject of the invention, an embodiment represented in the appended drawing will now be described, by way of purely illustrative and non-limiting example.

In this drawing.

DETAILED DESCRIPTION OF PREFERRED EMBODIMENTS

Figure 1:
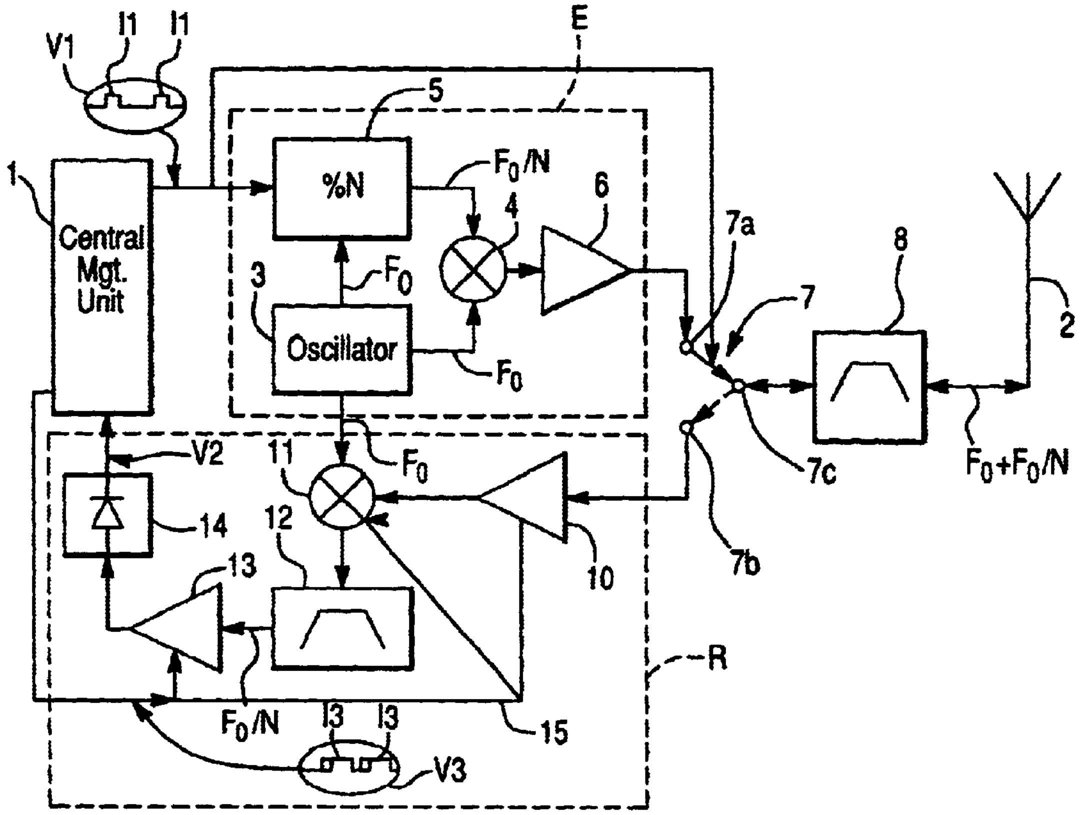
FIG. 1 is a functional schematic diagram of the recognition device of the system of the invention.

In FIG. 1, the recognition device stowed onboard a vehicle comprises a central management unit 1 for controlling a transmission circuit E and a reception circuit R, which are both linked to the same transmitting/receiving antenna 2.

The transmission circuit E comprises an oscillator 3 with fixed frequency Fo, for example around 386 MHz. The output of the oscillator 3 is linked, in parallel, to an input terminal of a frequency mixer 4, and to the input terminal of a frequency divider 5. The feed to the divider 5 is controlled by a first control system V1 which is generated by a pulse generator integrated into the central management unit 1. This pulse generator delivers a DC voltage, in the form of square-waves, the duration of each pulse I1 being of the order of 500 ns and the time interval between two pulses being of the order of 50 μs. When the signal V1 is between two pulses I1, the feed to the divider 5 is cut off, whereas when the signal V1 delivers a pulse I1, the divider 5 is fed from the battery of the vehicle. When the feed to the divider 5 is cut off, the latter delivers a zero output signal. Conversely, when the divider 5 is fed, it outputs a pulsed oscillating signal, whose carrier frequency is equal to Fo/N, i.e. around 48 MHz, when the divisor N is equal to 8, and whose value is zero between each pulse. The output of the divider 5 is linked to the other input terminal of the aforesaid frequency mixer 4. The mixer 4 is of the very broadband type and sums the spectrum received from the divider 5 with the oscillating signal originating from the oscillator 3 so as to output a pulsed oscillating signal of carrier frequency equal to the sum Fo+Fo/N which corresponds to the exchange RF, i.e. around 434 MHz. Indeed, when the output from the divider 5 is at zero, the output from the mixer 4 will be almost zero, since it will be greatly attenuated. The output of the mixer 4 is linked to the input of a transmission amplifier with power gain 6, whose output is linked to a first so-called transmission terminal 7*a* of a two-way switch 7. The transmission circuit E consists of the aforesaid elements 3 to 6.

The switch 7 is linked by a second so-called reception terminal 7*b* to the reception circuit R. A third common terminal 7*c* of the switch 7 is linked to a bandpass filter 8, of the broadband type, centered on the exchange RF, that is to say at Fo+Fo/N. This filter 8 is linked in series to the aforesaid antenna 2.

The position of the switch 7 is controlled by the first control signal V1 generated by the central management unit 1, by way of a link 9. The switch 7 can take two positions: one sets up a link between the first terminal 7*a* and the common terminal 7*c*, as represented by the solid line in FIG. 1, so as to throw the recognition device over to the transmission circuit E; the other position represented dashed sets up a link between the common terminal 7*c* and the second terminal 7*b*, so as to throw the recognition device over to the reception circuit R. The switch 7 is thrown into its transmission position, when the signal V1 generates the pulses I1, and is thrown into its reception position, when the signal V1 is between the pulses I1.

Figure 3:
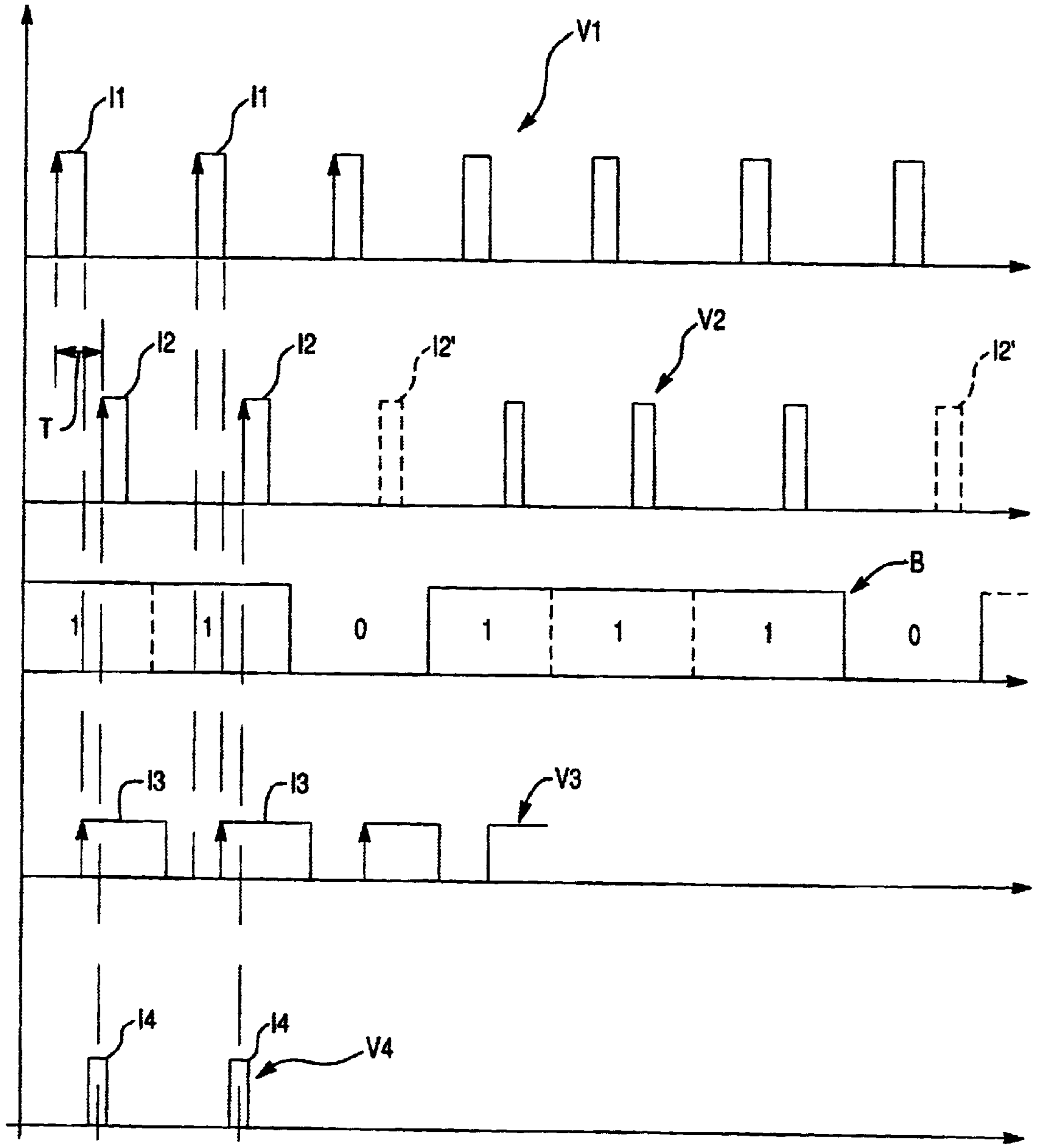
FIG. 3 is a sketch representing several signals used during the processing of the data for the implementation of the process of the invention.

The reception circuit R comprises a low-noise preamplifier 10, the input of which is linked to the second terminal 7*b* of the aforesaid switch 7. The output of the preamplifier 10 is linked to an input of a second frequency mixer 11 which receives on its other input the oscillating signal at the frequency Fo originating from the oscillator 3 of the transmission circuit E. The output signal from the mixer 11 is supplied to a bandpass filter 12, centered on the frequency Fo/N. The filter 12 is linked in series successively to a power-gain amplifier 13 and to an envelope detector 14. The output signal from the envelope detector 14 is a DC voltage V2, in the form of square-waves, whose pulses I2 are shifted in time with respect to the pulses I1, by a delay T which depends on the distance between the recognition device and the identifier and on the inherent time specific to their electronic circuits (see FIG. 3). This signal V2 is supplied to the central management unit 1 which comprises a microprocessor for measuring the time interval T between a transmitted pulse I1 and a received pulse I2.

The central management unit 1 is able to deliver a second control signal V3 which consists of a DC voltage, in the form of square-waves, each pulse I3 of the signal V3 having a rising edge which coincides with the falling edge of an associated pulse I1, the end of the pulse I3 occurring before the rising edge of the following pulse I1 of the first control signal V1. The signal V3 is intended for controlling the feeding of the preamplifier 10, of the mixer 11 and of the amplifier 13, via the line 15. The duration of each pulse I3 is sufficiently long to allow the reception of the signal by the identifier, its processing by the identifier, its return from the identifier to the recognition device, and the reception of the signal by the recognition device.

To measure whether the aforesaid time interval T corresponds to a normal delay, the central management unit 1 generates an observation signal V4 which consists of a DC voltage, in square-wave form, each pulse I4 of which corresponds to a listening window of duration around 400 ns, and whose center corresponds to the predetermined mean delay time which is for example of the order of 1 $\mu$s. Thus, during each listening window I4, the central management unit observes whether a rising edge of a pulse I2 of the signal V2 is detected. If such a rising edge is detected during a listening window I4, the microprocessor confirms that the delay is correct and stores it in an incremental variable. Thus, for a given number of pulses I1, if the number of correct delays is sufficiently high, for example greater than 50%, the communication between the identifier and the recognition device will be authorized. By way of example, any confirmation of a delay as being correct is performed with the aid of a triggered flip-flop, the so-called "D flip-flop", whose Cl input receives the second control signal V3, whose Ck input receives the signal V2, whose D input receives the observation signal V4, so as to deliver a binary 1 or 0 signal on its output Q, the value 1 corresponding to confirmation of a correct delay, whereas the value 0 corresponds to the absence of any rising edge of the signal V2 in a listening window I4. This binary value is supplied to the microprocessor of the central management unit 1.

Figure 2:
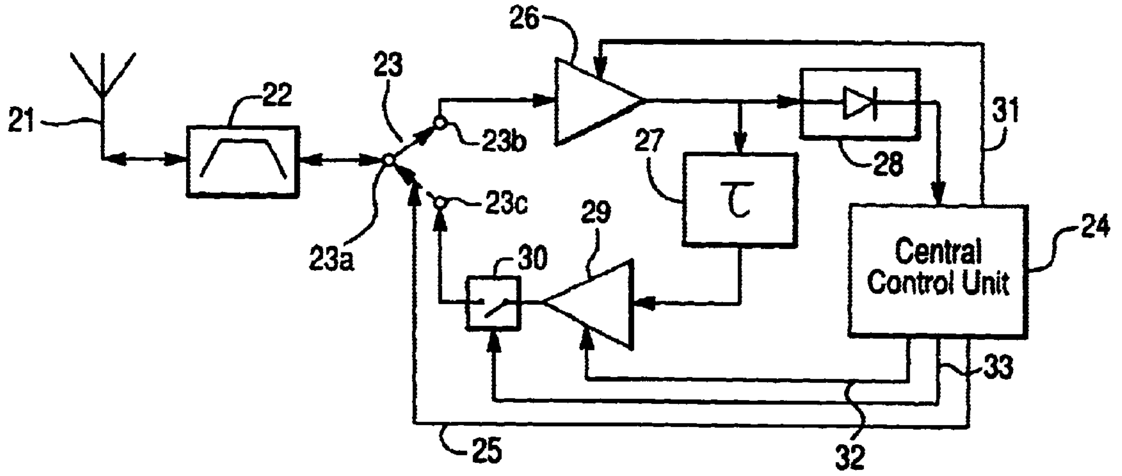
FIG. 2 is a functional schematic diagram of the identifier of the system of the invention.

Referring now to FIG. 2, it may be seen that the identifier comprises a single transmitting/receiving antenna 21 which is linked in series successively to a bandpass filter 22 centered on the exchange RF, and to the common terminal 23*a* of a two-way switch 23. The switch 23 can take two positions: a first position represented by solid lines in FIG. 2, for which the common terminal 23*a* is linked to a so-called reception terminal 23*b*; a second position represented dashed, for which a third so-called transmission terminal 23*c* is linked to the common terminal 23*a*. The position of the switch 3 is controlled by a central control unit 24, by virtue of a link 25 at the output of this unit 24.

The reception terminal 23*b* is linked to the input of a reception amplifier 26 with power gain, the output of this reception amplifier 26 being linked, on the one hand, to an analog delay line 27, and on the other hand, to a level detector 28. The delay line 27 is intended for outputting the signal received with a predetermined delay $\tau$, for example in the order of 800 ns. In this case, if the duration of a pulse I1 is 500 ns, this same pulse will be retransmitted around 300 ns after the end of reception of this pulse. The output of the delay line 27 is linked to the input of a transmission amplifier 29, whose output is connected to the transmission terminal 23*c* of the switch 23, by way of a chopper 30.

The output of the level detector 28 is linked to the central control unit 24, which may be of the microcontroller type. The unit 24 comprises three other control outputs 31 to 33, the control line 31 serving to control the feeding of the reception amplifier 26, the control line 32 serving to control the feeding of the transmission amplifier 29 and the control line 33 serving to control the chopper 30, as illustrated in FIG. 2.

The level detector 28 is intended for detecting the end of each pulse I1, in such a way that the central control unit 24 sends, forthwith, a control signal for deactivating the reception amplifier 26, via the line 31. Thus, the reception amplifier 26 then exhibits an input/output attenuation, instead of a gain. Simultaneously, the feeding of the transmission amplifier 29 is activated, by way of the line 32, in response to a control signal transmitted by the central control unit 24. At the same time, the central control unit 24 throws the switch 23 to the position represented dashed.

The delay line 27 delivers the signal with a delay $\tau$ to the amplifier 29, the feeding of which has previously been activated. Each pulse of the signal thus delayed is retransmitted by the identifier, if the chopper 30 closes the transmission circuit. The sequence for opening and for closing the chopper 30 is determined by a sequence known both to the identifier and to the recognition device. This sequence can correspond to the inherent identification code specific to each vehicle, this identification code being forwarded by the recognition device to the identifier, at the start of each interrogation. In this case, if the identification code is a three-byte digital code, provision may be made for each bit of the code to be associated with one pulse of the signal, so as to close the transmission circuit when the bit is at 1, and to open the transmission circuit when the bit is at 0, so as thereby to blank out a pulse, as represented dashed in FIG. 3, the blanked-out pulse being designated by the reference I2'. The binary signal for controlling the chopper 30 is indicated by the arrow B in FIG. 3. Given that the identification code is known by the recognition device, the latter's central management unit 1 will verify whether a pulse is received during the observation window I4 which corresponds to a pulse normally blanked out.

If certain pulses were not blanked out by the identifier, the system according to the invention would be very effective since it actually makes it possible to detect very small variations in delay, but were any potential offenders to know that at the moment of transmission of the RF signal by the vehicle, the recognition device is simply waiting for the same signal returned by the identifier, but simply shifted in time, the offenders could directly place a repeater in the vicinity of the vehicle, so as to return the signal directly to the vehicle, thus avoiding the remote path through the trunks. The action of blanking out certain pulses by the identifier makes it possible to avoid this drawback, since the offenders are then compelled to go via the identifier, thereby necessarily giving rise to a delay time which will be detected by the recognition device. Thus, if the central management unit 1 detects certain pulses in the listening windows corresponding to the blanked-out pulses, the system will bar access to the vehicle.

Finally, after any retransmission of a pulse by the identifier, the central control unit 24 will order both the throwing of the switch 23 over to its reception position illustrated by solid lines in FIG. 2, the deactivation of the feeding of the transmission amplifier 29 and the activation of the feeding of the reception amplifier 26, at the end of a predetermined timeout, for example of the order of 5 μs, which is initialized by the detection of the end of each pulse, by the level detector 28. Thus, the identifier is ready to process the following pulse of the transmission signal.

The manner of operation of the system according to the invention will now be briefly explained.

When the recognition device formulates an identification request, the central management unit 1 causes the switch 7 to be thrown over to its position shown by solid lines in FIG. 1. The recognition device then transmits, via the antenna 2, a pulsed oscillating signal, whose carrier frequency corresponds to the exchange radio frequency, and the envelope of whose signal corresponds to the signal V1. This interrogation signal is received by the identifier whose switch 23 is thrown over to the position represented by solid lines in FIG. 2, to receive the identification signal. After correct identification of the code by the identifier, this code is stored in the central control unit 24 so as to be able to control the chopper 30. After a delay time τ, the identifier retransmits the signal, at the same carrier frequency, the envelope of which corresponds to the signal V2, with certain pulses I2' having been blanked out, in accordance with the sequence of the bits of the identification code B.

The response signal transmitted by the identifier is received by the recognition device which meanwhile has caused the switch 7 to switch over to the reception circuit R. The signal thus received by the recognition device is processed in the reception circuit R, so as to deliver the signal V2 to the central management unit 1. If the signal goes via an authorized identifier, situated at a distance below a predetermined limit from the vehicle, the correct delay time is of the order of 1 μs. In this case, the pulse I2 of the signal V2 has a rising edge situated in a listening window I4 centered on the mean delay of 1 μs, with an error margin of +/−200 ns. Of course, the recognition device is aware that it ought not to receive any pulse in the response signal, when the pulse corresponds to a bit equal to 0 of the identification code.

If there is introduction of a relay transmitter into the loop formed by the recognition device and the identifier, the transit time through this loop will increase, and the pulse of the received signal will then be outside the aforesaid listening windows, thus giving an incorrect delay cue.

Furthermore, if a repeater is simply placed in proximity to the vehicle, without going via the identifier, the recognition device will receive all the pulses previously transmitted, with a correct delay time, but with no blanking out of certain pulses. Thus, the system will be capable of differentiating the presence of a simple repeater from that of the authorized identifier.

Thus, the system proposed allows bidirectional radio frequency transmission to be made secure by detecting the presence of a relay transmitter between the identification circuit of the vehicle and the badge incorporating the identifier, by using the latter as a partial repeater of the identification signal, and by barring access to the vehicle or to the enclosed space, when such relay transmitters are detected by reason of an overly large delay time or of the reception of a pulse which ought to be blanked out according to the identification code of the vehicle.

Although the invention has been described in conjunction with several particular variants, it is quite obvious that it is in no way limited thereto and that it comprises all the technical equivalents of the means described as well as their combinations, if the latter come within the framework of the invention.

What is claimed is:

1. A process for the bidirectional transmission of data, in an access system, allowing access to an enclosed space, the process consisting in setting up a remote exchange of data between a recognition device installed in the enclosed space and an identifier intended to he carried by a user, access being authorized only when the recognition device has authenticated the identifier, which process consists in setting up an RF exchange of data at the same radio frequency between the recognition device and the identifier, and in delaying, in the course of this exchange, the transmission of a response signal by the identifier to the recognition device by a predetermined duration (τ) with respect to the reception by the identifier of an interrogation signal transmitted by the recognition device, so that neither the recognition device nor the identifier operate simultaneously in transmission and in reception at said RF exchange, which consists in transmitting, at the level of the recognition device, a pulsed oscillating signal, the carrier frequency of each pulse (I1) of which correspond, to said RF exchange, the duration of each pulse being very short with respect to the recurrence period of the pulses, in receiving, at the level of the identifier, said pulsed oscillating signal and in delaying its retransmission to the recognition device by said predetermined duration (τ), which is greater than the duration of a pulse and less than said recurrence period, in retransmitting said delayed pulsed oscillating signal to the recognition device, and in receiving, at the level of the recognition device, said delayed pulsed oscillating signal retransmitted by the identifier, and which consists, at the level of the recognition device, in order to transmit said pulsed oscillating signal at the RF exchange: in generating an oscillating signal at a reference radio frequency Fo substantially different from the RF exchange, in generating a continuous pulsed signal (V1), which defines a first control signal, having the same recurrence period and the same duration of the pulses (I1) as the aforesaid pulsed oscillating signal, in feeding a frequency divider by N (5) with said first control signal, in inputting into said divider said oscillating signal so as to output a pulsed oscillating signal having a frequency Fo/N, in mixing said pulsed oscillating signal at Fo/N with said oscillating signal at Fo, in filtering the outgoing mixed signal so as to center it on the frequency Fo+Fo/N, said central frequency corresponding to the RF exchange, and in transmitting said filtered mixed signal to the identifier.

2. The process as claimed in claim 1, which consists in switching the recognition device over to its transmission circuit (E) or its reception circuit (R), in response to the first control signal (V1), the recognition device switching over to the transmission circuit during each pulse (I1) of the first control signal and over to the reception circuit between the pulses of said first control signal.

3. The process as claimed in claim 1, which consists, at the level of the recognition device, in receiving the delayed pulsed oscillating signal retransmitted by the identifier, in mixing it with said oscillating signal at Fo, in filtering the outgoing signal thus mixed so as to center it on the frequency Fo/N, in detecting the envelope of the signal thus filtered, in measuring the time interval (T) between the rising edge of each pulse (I1) of the first control signal (V1) and the rising edge of each pulse (I2) of the detected envelope signal (V2), in comparing this time measurement with an initially stored delay value, which is saved by the system, so as to prevent the exchange of identification data if the statistical deviation over several pulses between the time measured and the time stored, is greater than a predetermined threshold value, so as to make transmission secure beyond a predetermined distance, so as to avoid tampering through the interposition of an unauthorized repeater between the recognition device and the identifier.

4. The process as claimed in claim 3, which consists, at the level of the recognition device, for the reception of the signal retransmitted by the identifier, in generating a continuous pulsed observation signal (V4), the duration of whose pulses (I4) corresponds to a listening window, with the same recurrence period as the first control signal (V1), said window being centered on the initially stored delay value, and in detecting any rising edge of a pulse of the detected envelope signal (V2) in the course of each listening window.

5. The process as claimed in claim 3, which consists, at the level of the recognition device, for the reception of the signal retransmitted by the identifier, in generating a second continuous pulsed control signal (V3), each pulse (I3) of which starts at the end of each pulse (I1) of the first control signal (V1) and terminates after a duration less than the recurrence period of the first control signal, said second control signal serving to feed the reception mixer (11) of the recognition device.

6. The process as claimed in claim 3, which consists, at the level of the identifier, in disabling the retransmission of certain pulses according to a predetermined sequence (B) which is previously forwarded by the recognition device, and, at the level of the recognition device, in measuring the time interval for the pulses (I2) received during the listening windows corresponding to the non-disabled pulses, and in counting up the number of pulses possibly received during the listening windows corresponding to the disabled pulses (I2'), so as to detect any presence of an unauthorized repeater in proximity to the recognition device, at a distance below the authorized maximum limit.

7. The process as claimed in claim 6, which consists, at the level of the identifier, in chopping the delayed signal before its retransmission, according to the binary value of the bits of a coded identification signal (B) previously forwarded by the recognition device.

8. A system for the bidirectional transmission of data for implementing a process for the bidirectional transmission of data, in an access system, allowing access to an enclosed space, the process consisting in setting up a remote exchange of data between a recognition device installed in the enclosed space and an identifier intended to be carried by user, access being authorized only when the recognition device has authenticated the identifier, which process consists in setting up an RF exchange of data at the same radio frequency between the recognition device and the identifier, and in delaying, in the course of this exchange, the transmission of a response signal by the identifier to the recognition device by a predetermined duration (τ) with respect to the reception by the identifier of an interrogation signal transmitted by the recognition device, so that neither the recognition device nor the identifier operate simultaneously in transmission and in reception at said RF exchange, said system comprises a recognition device installed in the enclosed space, comprising a radio frequency transmission circuit (E), a radio frequency reception circuit (R) which are both linked to the same first antenna (2), by way of a two-way switch (7), an identifier intended to be carried by a user, comprising a radio frequency transmitter (29) and a radio frequency receiver (26), which are both linked to the same second antenna (21), by way of a second two-way switch (23), and a delayer means (27) interposed between the output of the receiver and the input of the transmitter of the identifier, so as to delay the retransmission of the signal by the identifier at the same RF exchange as the transmission of the signal by the recognition device, by a predetermined duration (τ) with respect to the reception by the identifier of an interrogation signal transmitted by the recognition device, so that neither the recognition device nor the identifier operate simultaneously in transmission and in reception at said RF exchange wherein the transmission circuit (E) of the recognition device comprises an oscillator (3) with reference frequency Fo which is intended to deliver an oscillating output signal at said reference frequency, said output signal being supplied in parallel to a frequency divider by N (5) and to a mixer (4), said divider being intended to he fed with a first continuous pulled control signal (V1) delivered by a central management unit (1), the output terminal of the divider (5) being linked to another input of the mixer (4), the mixer being linked at its output to a transmission amplifier (6) with power gain, whose output is linked to a first transmission terminal (7*a*) of the first switch (7) of the recognition device, and wherein the reception circuit (R) of the recognition device can comprise a low-gain preamplifier (10), linked at its input to a second reception terminal (7*b*) of the first switch (7), the output of the preamplifier being linked to a second mixer (11) which receives, on its second input, the oscillating signal at Fo delivered in parallel by the oscillator (3) of the transmission circuit (F), said second mixer being linked in series to a bandpass filter (12) centered on the frequency Fo/N, then to a gain amplifier (13), and to an envelope detector (14) which is connected to said central management unit (1).

9. The system as claimed in claim 8, wherein the receiver of the identifier comprises a reception amplifier (26) linked, at its input, to a first receiving terminal (23*b*) of the second switch (23) and, at its output, on the one hand, to the aforesaid delayer means (27), and on the other hand, to a level detector (28), whereas the transmitter of the identifier comprises a transmission amplifier (29), linked, at its input, to the output of the delayer means and, at its output, to a second transmitting terminal (23*c*) of the second switch, the third common terminal (23*a*) of the second switch being linked to a bandpass filter (22) centered on the RF exchange which is linked, in its turn, in series to said second antenna (21), the identifier comprising a central control unit (24) which is able to receive the output signal from the level detector so as to control the feeding or the deactivation of the amplifiers and the switching over of the second switch.

10. The system as claimed in claim 9, wherein a chopper (30) is interposed between the transmission amplifier (29) and the transmission terminal (23c) of the identifier, said chopper being controlled by the central control unit (24) so as to disable the retransmission of certain pulses (I2') according to a predetermined sequence (B).

11. The system as claimed in claim 8, wherein the first switch (7) comprises a third common terminal (7c) linked in series to a bandpass filter (8) centered on the RF exchange and to said first antenna (2), the first switch being controlled by said first control signal (V1).

12. The system as claimed in claim 8, wherein the central management unit (1) is able to generate a second continuous pulsed control signal (V3) whose pulses (I3) are alternated with those of the first control signal (V1), so as to control the feeding of the preamplifier (10), of the amplifier (13) and of the mixer (11) of the reception circuit (R) of the recognition device.

13. A system for the bidirectional transmission of data for implementing a process for the bidirectional transmission of data, in an access system, allowing access to an enclosed space, the process consisting in setting up a remote exchange of data between a recognition device installed in the enclosed space and an identifier intended to be carried by a user, access being authorized only when the recognition device has authenticated the identifier, which process consists in setting up an RF exchange of data at the same radio frequency between the recognition device and the identifier, and in delaying, in the course of this exchange, the transmission of a response signal by the identifier to the recognition device by a predetermined duration (τ) with respect to the reception by the identifier of an interrogation signal transmitter by the recognition device, so that neither the recognition device nor the identifier operate simultaneously in transmission and in reception at said RF exchange, said system comprises a recognition device installed in the enclosed space, comprising a radio frequency transmission circuit (E), a radio frequency reception circuit (R) which are both linked to the same first antenna (2), by way of a two-way switch (7), an identifier intended to be carried by a user, comprising a radio frequency transmitter (29) and a radio frequency receiver (26), which are both linked to the same second antenna (21), by way of a second two-way switch (23) and a delayer means (27) interposed between the output of the receiver and the input of the transmitter of the identifier, so as to delay the retransmission of the signal by the identifier at the same RF exchange a the transmission of the signal by the recognition device, by a predetermined duration (τ) with respect to the reception by the identifier of an interrogation signal transmitted by the recognition device, so that neither the recognition device nor the identifier operate simultaneously in transmission and in reception at said RF exchange, wherein the delayer means (27) comprises a delay line, consisting of surface wave components.

14. A process for the bidirectional transmission of data, in an access system, allowing access to an enclosed space, the process consisting in setting up a remote exchange of data between a recognition device installed in the enclosed space and an identifier intended to be carried by a user, access being authorized only when the recognition device has authenticated the identifier, which process consists in setting up an RF exchange of data at the same radio frequency between the recognition device and the identifier, and in delaying, in the course of this exchange, the transmission of response signal by the identifier to the recognition device by a predetermined duration (τ) with respect to the reception by the identifier of an interrogation signal transmitted by the recognition device, so that neither the recognition device nor the identifier operate simultaneously in transmission and in reception at said RF exchange, which consists in transmitting, at the level of the recognition device, pulsed oscillating, signal, the carrier frequency of each pulse (I1) of which corresponds to said RF exchange, the duration of each pulse being very short with respect to the recurrence period of the pulses, in receiving, at the level of the identifier, said pulsed oscillating signal and in delaying its retransmission to the recognition device by said predetermined duration (τ), which is greater than the duration of a pulse and less then said recurrence period, in retransmitting said delayed pulsed oscillating signal to the recognition device, and in receiving, at the level of the recognition device, said delayed pulsed oscillating signal retransmitted by the identifier, and which comprises, at the level of the identifier, the following steps which consist: in amplifying the received signal, in delaying said amplified received signal by said predetermined duration (τ), in detecting the end of each pulse (I1) of the amplified received signal, in deactivating the amplification of the receiver and in activating the amplification of the transmitter of the identifier after the detection of the end of each pulse, in amplifying the delayed signal so as to retransmit it to the recognition device, in deactivating the amplification of the transmitter and in activating the amplification of the receiver of the identifier, at the conclusion of a given timeout, counting from the detection of the end of each pulse, and wherein said radio frequency for said RF exchange is chosen from a group of frequencies consisting of 315 MHz, 434 MHz and 868 MHz, and wherein the duration of each pulse of said pulse oscillating signal is set to 0.5 $\mu$s and the recurrence period is set to 50 $\mu$s, and said predetermined duration (τ) is set to 0.8 $\mu$s.

* * * * *